May 19, 1953  C. L. MILLIGAN ET AL  2,639,159
TRAILER SUPPORTING AND STEERING DOLLY AND WEIGHT EQUALIZER
Filed Sept. 27, 1949
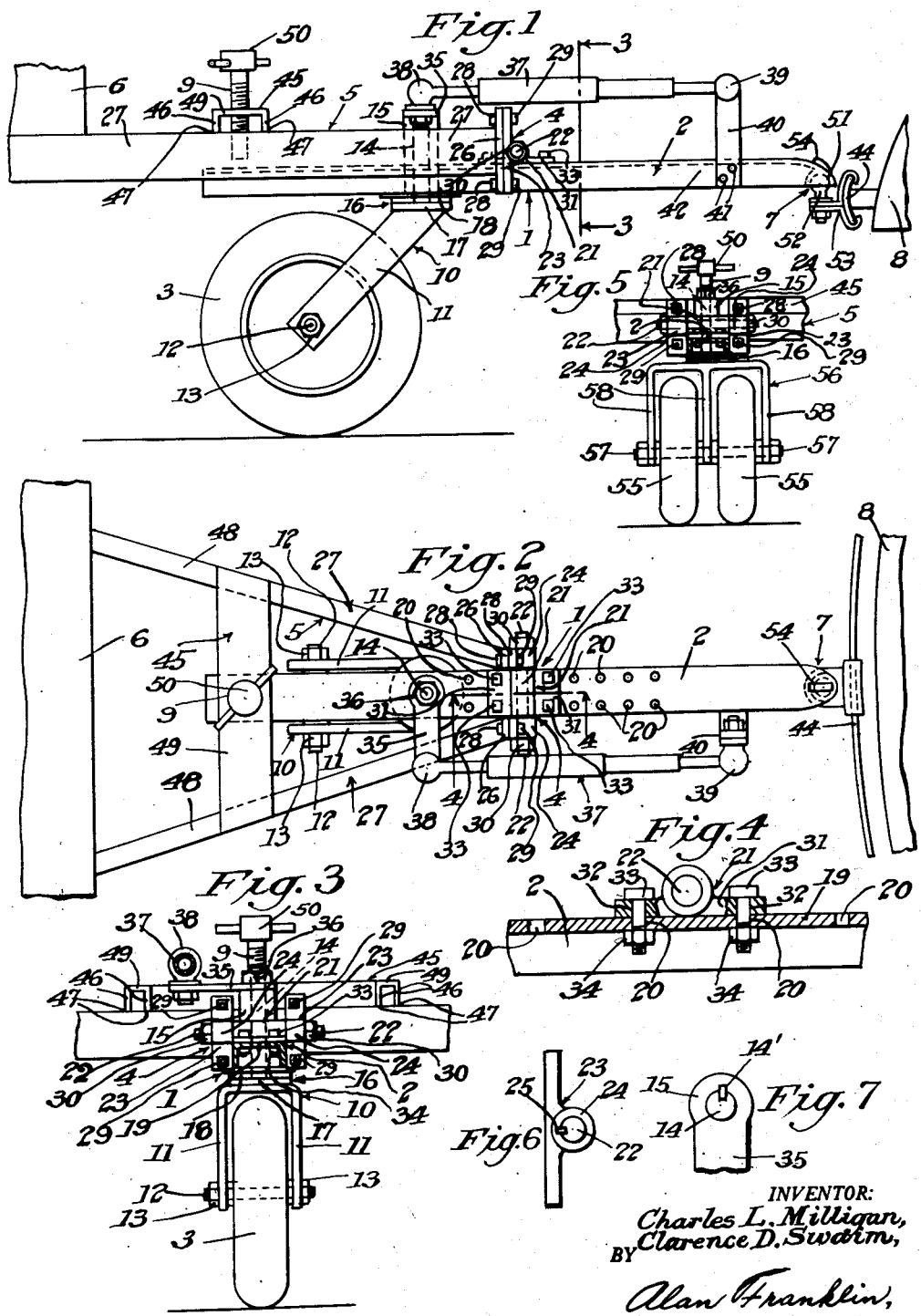
INVENTOR:
Charles L. Milligan,
Clarence D. Swaim,
BY Alan Franklin,
ATTORNEY.

Patented May 19, 1953

2,639,159

UNITED STATES PATENT OFFICE 2,639,159

TRAILER SUPPORTING AND STEERING DOLLY AND WEIGHT EQUALIZER

Charles L. Milligan, San Fernando, Calif., and Clarence D. Swaim, Waterloo, Iowa Application September 27, 1949, Serial No. 117,964

1 Claim. (Cl. 280—33.44)

This invention relates to trailer hitches and weight equalizers, and more particularly to a hitching, steering and weight-equalizing dolly for trailers.

The general object of the invention is to provide a third-wheel steering and weight-equalizing support and hitch for trailers.

A more particular object is to provide a single or double-wheel supporting and steering dolly, to which the front end of a two-wheel trailer may be connected for supporting part of the weight of said end of the trailer, and which dolly may be hitched to a towing vehicle upon which the other part of the weight of said end of the trailer may be supported.

Another object is to provide a dolly and equalizer of the character stated, including adjusting means for equalizing the weight of the front end of the trailer on the dolly and on the towing vehicle proportionately, as conditions require.

Another object is to provide a dolly of the character stated to which the trailer may be pivotally connected to enable the trailer and the dolly to move freely up or down with relation to each other in traveling over irregular roads.

A further object is to provide a dolly of the character stated including means, such as a jack, for lowering or lifting the hitching end of the dolly for engaging or disengaging the ball and socket joint or other coupling, which hitches the dolly to a towing vehicle.

Other objects and advantages will appear hereinafter as this specification progresses.

The invention is illustrated in the annexed drawing, which forms a part of this specification, and in which:

Fig. 1 is a side elevation of the invention shown connected to a trailer and a towing vehicle.

Fig. 2 is a plan view of Fig. 1.

Fig. 3 is a transverse vertical section of the invention taken on line 3—3 of Fig. 1.

Fig. 4 is a longitudinal section taken on line 4—4 of Fig. 2 showing a detail of construction.

Fig. 5 is an end view of a modification of the invention.

Fig. 6 is a side view of one of the rocker connecting members of the dolly for pivotally connecting the dolly to a trailer.

Fig. 7 is a plan view of the shock absorber connecting arm shown keyed to the upper end of the steering post of the steering wheel.

Referring more particularly to the drawing, in which the same reference numerals designate the same parts in all of the views, our invention includes primarily a dolly 1; an inverted channel beam 2; a supporting and steering wheel 3, upon which said beam 2 is turnably mounted; connecting means 4 for pivotally connecting the forward end of the tongue 5 of a trailer 6 to the rear portion of said dolly beam; a universal joint 7 for universally connecting the forward end of the dolly 1 to the rear end of a towing vehicles 8; and a jack screw 9 for engaging and depressing the rear end of the dolly beam 2 to swing the forward end of said beam up from the connecting means 4, as a pivot, for disengaging the universal joint 7 to disconnect the dolly from the towing car 8, when so desired.

The supporting and steering wheel 3 is journaled within a depending fork 10 between the arms 11 of said fork on a shaft 12 extending through the hub bearing of said wheel and through the lower ends of said fork arms 11, on the outer ends of which shaft 12 are threaded nuts 13 against the outer sides of said fork arms, respectively, for securing said shaft in said fork arms. A steering post 14 extends upwardly from the upper end of said fork 10 through a bearing 15 on the dolly beam 2, which bearing extends upwardly through and above said dolly beam, and an end-thrust bearing 16 is interposed between said upper end of said fork and the lower side of said beam 2, which end-thrust bearing comprises a lower bearing member 17 on the upper end of the fork 10, and an upper bearing member 18 on the lower end of the bearing 15 and the lower side of the dolly beam 2 turnably resting upon said lower bearing member 17, through which upper bearing member 18 and the bearing 15 extends the steering post 14. The upper wall 19 of the inverted channel beam 2 of the dolly 1 is provided with two rows of bolt holes 20, which rows extend longitudinally of said beam near opposite sides thereof, respectively. Said bolt holes 20 are suitably spaced, in each of said rows of holes, longitudinally of the beam 2, and the holes in each of said rows are spaced directly opposite the holes, respectively, in the other row transversely of said beam. By means of said bolt holes 20 the connecting means 4 for the trailer 6 may be adjustably secured in different positions to the dolly beam 2 longitudinally of said beam in the manner hereinafter more fully described.

The connecting beams 4 for connecting the tongue 5 of the trailer to the dolly beam 2, includes a bearing 21 detachably secured to the upper side of said beam, a pivot shaft 22 extending through and journaled in said bearing 21, a pair of connecting rocker members 23, formed at their forward sides with hubs 24 keyed on the end portions of said pivot shaft 22, respectively, by keys 25, and flanges 26 formed on the forward ends of the forwardly converging channel-bar side arms 27 of the trailer tongue 5, which flanges 26 are bolted to the rear of said rocker members 23, respectively, by bolts 28 and nuts 29, whereby the trailer tongue 5 is detachably and pivotally connected at its forward end to the dolly. Nuts 30 are threaded on the ends of the pivot shaft 22 against the hubs 24 of the connecting members 23 to prevent said connecting members from sliding off the ends of said pivot shaft. The bearing 21 is formed with a base 31 provided with four bolt holes 32 in the four corners, respectively, thereof, which base rests upon the upper wall 19 of the dolly channel beam 2, and through each of which bolt holes and a bolt hole 20 in said wall of said beam 2 is extended a bolt 33 for detachably securing said bearing to the upper wall 19 of said channel beam, there being a nut 34 threaded on the lower end of said bolt against the under side of said channel beam wall 19.

On the upper end portion of the steering post 14, which extends above the upper end of the bearing 15 is keyed by a key 14' a crank arm 35 resting upon the upper end of said bearing, and a nut 36 is threaded on the upper end of said steering post 14 against said crank arm to hold said crank arm in position on said steering post. The rear end of a conventional pneumatic shock absorber 37 is connected by a universal joint 38, to the outer end of said crank arm 35, while the forward end of said shock absorber is connected, by a universal joint 39, to the upper end of a vertical bracket 40 which is secured at its lower end by bolts 41 to a side wall 42 of the channel beam 2 of the dolly 1.

The jack screw 9 is mounted in a channel cross bar 45 on the trailer tongue 5, which bar extends, in an inverted position, across said tongue and is welded at the lower edges of its side walls 46, at 47, to the upper walls 48 of the channel-bar side arms 27 of said trailer tongue, the jack screw 9 being threaded in and extending through the upper base wall 49 of said inverted channel cross bar 45, with the lower end of said jack screw positioned directly over the dolly beam 2 near the rear end of said beam. On the upper end of said jack screw is secured a suitable handle 50 for turning said screw.

The universal joint 7 may be of the conventional ball and socket type with the socket 51 of said joint formed on the forward end of the dolly beam 2, and the ball 52 of said joint mounted on a clamp bracket 53 clamped on the rear bumper 44 of the towing car 8.

In Fig. 6, showing the outer side of one of the connecting rocker members 23, the nut 30 on the near end of the pivot shaft 22 is removed to show the key 25 which keys said rocker member on said end of said shaft.

In Fig. 7 the nut 36 is removed from the upper end of the steering post 14 to show the key 14' for keying the inner end of the connecting arm 35 of the shock absorber on the upper end of the steering post 14.

The operation of our invention is as follows:

To connect the trailer 6 to the dolly 1, the pivot bolt 22 being extended through the bearing 21, the hubs 24 of the connecting rocker members 23 being fitted and keyed on the ends of said pivot bolt 22 and the nuts 30 being threaded on the ends of said bolt against said hubs 24 of said connecting rocker members 23, the flanges 26 on the forward ends of the arms 27 of the trailer tongue 5 are placed against the rear sides of the rocker connecting members 23, and said flanges 26 are bolted by the bolts 28 and nuts 29 to said rocker connecting members 23. The jack screw 9 may then be turned by its handle 50 to cause it to move downwardly through the threaded upper wall 49 of the channel cross bar 45, and the lower end of said screw, in engagement with the upper wall 19 of the dolly beam 2, to depress the rear end of said beam and swing the forward end of said beam upwardly on the pivot shaft 22 into a position with the socket 51 of the ball and socket joint 7 at a level above the level of the ball 52 of said joint on the rear of the towing car 8, as shown in dotted lines of Fig. 1 of the drawing. The towing car is then backed to a position with the ball 52 on said car directly under the socket 51 on the raised forward end of the dolly beam 2. The jack screw 9 is then turned in a reverse direction to raise it and allow the forward end of the dolly beam 2 to swing down on pivot shaft 22 until the socket 51 fits over the ball 52 of the ball and socket joint 7, as shown in Fig. 1 of the drawing, thus universally connecting the forward end of the dolly 1 to the rear end of the towing car 8. The ball and socket of the universal joint 7 may then be locked together in the conventional manner by its lock 54. The jack screw 9 is also used for depressing the rear end and swinging up the forward end of the dolly beam 2 for disengaging the universal joint 7 and disconnecting the dolly from the towing car, when so desired.

The connection of the trailer 6 by its tongue 5 to the dolly 1, by the pivot shaft 22, and the universal connection of the forward end of the dolly to the rear end of the towing car 8, by the universal joint 7, places part of the weight of the forward end of the trailer on the dolly and part on the rear end of the towing car, thus equalizing the weight of the forward end of the trailer on the dolly and the towing car.

The equalization of the weight of the forward end of the trailer on the dolly and the towing car may be adjusted, as desired, by securing the pivot connection bearing 21 to the dolly beam 2 in different positions along said beam, which is done by extending the bearing bolts 29 through the bolt holes 28 in the base 27 of said bearing 21 and through different bolt holes 20, in the upper wall 19 of the dolly beam, in registration with the bolt holes 28 in said bearing base.

In traveling over irregular road surfaces, the trailer 6 may swing up or down on the pivot shaft 22 with the weight of the forward end of the trailer always equalized on the dolly and the towing car, and the dolly wheel 3 always resting upon the surface of the road.

In the modification of our invention shown in Fig. 5 of the drawing, two or a pair of supporting and steering wheels 55 are substituted for the single supporting and steering wheel 3, which wheels 55 are journaled within a double fork 56 side-by-side on the same axle 57 secured in the lower ends of the three fork prongs 58. The dolly beam 2 is turnably mounted upon said supporting and steering wheels 55 by means of the fork 56, and the end thrust bearing 16 and the steering post 14.

The two supporting and steering wheels 55 will not shimmy, and require no shock absorber like the shock absorber 37 for a single supporting and steering wheel 3.

We claim:

In combination, a dolly including a wheel and a beam mounted upon said wheel, a bearing secured to said beam, a pivot shaft turnably fitted in said bearing, connecting members on the ends, respectively, of said pivot shaft, to which connecting members the forward ends of the arms of a trailer tongue may be secured for pivotally connecting a trailer to said dolly to enable the trailer and said dolly to move up or down with relation to each other over an irregular road surface, means for operatively connecting the forward end of said dolly beam to a towing car, a jack mounted on said trailer tongue, rearwardly of the pivotal connection between the trailer and the dolly, for engaging the upper rear part of the dolly beam for swinging the forward end of said beam upwardly for disconnecting the connecting means between the forward end of said dolly beam and said towing car.

CHARLES L. MILLIGAN.
CLARENCE D. SWAIM.

References Cited in the file of this patent

UNITED STATES PATENTS

| Number | Name | Date |
|---|---|---|
| 2,271,304 | Mulholland | Jan. 27, 1942 |
| 2,344,921 | McDaniel | Mar. 21, 1944 |
| 2,376,001 | Nogle | May 15, 1945 |
| 2,385,099 | Nelson | Sept. 18, 1945 |
| 2,411,009 | Slimp | Nov. 12, 1946 |
| 2,440,502 | Etgen | Apr. 27, 1948 |
| 2,496,515 | Bayes | Feb. 7, 1950 |